US007669038B2

(12) United States Patent
Burky et al.

(10) Patent No.: US 7,669,038 B2
(45) Date of Patent: *Feb. 23, 2010

(54) METHOD AND APPARATUS FOR BACK TO BACK ISSUE OF DEPENDENT INSTRUCTIONS IN AN OUT OF ORDER ISSUE QUEUE

(75) Inventors: William Elton Burky, Austin, TX (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/114,010

(22) Filed: May 2, 2008

(65) Prior Publication Data

US 2008/0209178 A1     Aug. 28, 2008

Related U.S. Application Data

(63) Continuation of application No. 11/380,078, filed on Apr. 25, 2006, now Pat. No. 7,380,104.

(51) Int. Cl.
*G06F 9/30* (2006.01)
(52) U.S. Cl. ............... 712/214; 712/215; 712/216; 712/217; 712/218
(58) Field of Classification Search .......... 712/214–219
See application file for complete search history.

(56) References Cited

U.S. PATENT DOCUMENTS

| 5,655,096 | A | 8/1997 | Branigin |
|---|---|---|---|
| 5,745,726 | A | 4/1998 | Shebanow et al. |
| 5,761,476 | A | 6/1998 | Martell |
| 5,802,386 | A | 9/1998 | Kahle et al. |
| 6,249,855 | B1 | 6/2001 | Farrell et al. |
| 6,304,953 | B1 | 10/2001 | Henstrom et al. |
| 6,512,397 | B1 | 1/2003 | Jacobson et al. |
| 6,697,939 | B1 | 2/2004 | Kahle |
| 6,728,866 | B1 | 4/2004 | Kahle et al. |
| 2001/0042192 | A1 | 11/2001 | Le et al. |
| 2003/0208672 | A1 | 11/2003 | Leenstra et al. |
| 2004/0139299 | A1 | 7/2004 | Busaba et al. |
| 2005/0149698 | A1 | 7/2005 | Yeh et al. |
| 2007/0074005 | A1 | 3/2007 | Abernathy et al. |

*Primary Examiner*—Eddie P Chan
*Assistant Examiner*—Idriss N Alrobaye
(74) *Attorney, Agent, or Firm*—Yee & Associates, P.C.; Libby Z. Handelsman

(57) ABSTRACT

A method is provided for evaluating two or more instructions in an out of order issue queue during a particular cycle of the queue, to select an instruction for issue during the next following cycle. If an instruction was previously designated to issue during the particular cycle, one or more instructions in the queue are evaluated to determine if any of them are dependent on the designated instruction. For the evaluation, each instruction placed into the queue is accompanied by corresponding logic elements that provide destination to source compares for the instruction. In an embodiment comprising a method, the oldest ready instruction in the queue during a particular cycle is identified. When an instruction was previously designated to issue during the particular cycle, it is determined whether at least a first instruction in the queue complies with each condition in a set of conditions, the set including at least the conditions that the first instruction has a dependency on the designated instruction, and that the first instruction is older than the oldest ready instruction. The first instruction is selected for issue during the next following cycle only if the first instruction complies with each condition in the set.

10 Claims, 3 Drawing Sheets

METHOD AND APPARATUS FOR BACK TO BACK ISSUE OF DEPENDENT INSTRUCTIONS IN AN OUT OF ORDER ISSUE QUEUE

This application is a continuation of application Ser. No. 11/380,078, filed Apr. 25, 2006, status allowed.

BACKGROUND OF THE INVENTION

1. Field of the Invention

The invention disclosed and claimed herein generally pertains to a method and apparatus for selecting dependent instructions in an out of order issue queue for issue out of the queue. More particularly, the invention pertains to a method of the above type that allows back to back issue of dependent instructions. Even more particularly, the invention pertains to a method of the above type that allows multiple instructions to be considered during a cycle of the queue, so that one of them can be selected for issue out of the queue during the very next cycle.

2. Description of the Related Art

As is well known by those of skill in the computer arts, instructions are placed in an issue queue during successive cycles, for sequential issue and execution. However, in an out of order issue queue, some of the instructions can be selected for issue ahead of older or earlier instructions. As is further well known, currently available out of order issue queues generally allow dependent instructions to issue no more frequently than every other cycle, and thus do not support back to back issue of dependent instructions. A dependent instruction is one that must wait for issue and execution of an earlier instruction, in order to ensure that essential data required by the dependent instruction will be available. Back to back issue refers to issue of instructions from the queue during each of two consecutive cycles of queue operation.

To illustrate an out of order issue queue of currently available design, the following code sequence may be considered:
1) Add 1,x,x,
2) Add x,1,x The out of order issue queue of the current design will take three cycles to issue both of these instructions, following initial selection of instruction 1. The timing diagram for this queue, showing successive pipeline stages, is as follows:

|  | cycle | | | |
| --- | --- | --- | --- | --- |
|  | 0 | 1 | 2 | 3 |
| 1) add 1, x, x | select | issue | | |
| 2) add x, 1, x | | cmp | select | issue |

Instruction 1 is selected to issue during cycle 0, and is actually issued during cycle 1. Also during cycle 1, all instructions in the issue queue resolve dependencies, through destination to source compares. From this effort, it is determined that a source register of instruction 2 matches the target destination register of instruction 1. Accordingly, the source of instruction 2 is set to ready, to indicate that data needed for instruction 2 will be available. In cycle 2 instruction 2 is selected for issue, and during cycle 3 instruction 2 issues.

To improve on the above current design, and to thereby avoid wasted cycle time, it would be beneficial to provide an out of order issue queue in which back to back issue of dependent instructions is allowed to occur. In particular, it would clearly be beneficial to have instruction 2 selected during cycle 1 rather than cycle 2, so that instruction 2 would issue during cycle 2 instead of during cycle 3. This would reduce the issue time by an entire cycle. However, while some solutions have previously been proposed to achieve back to back issue, such solutions have typically required substantial hardware. For example, some of the proposed solutions pre-calculate all the dependencies of an instruction as it is placed into an issue queue. This requires a large number of compares and latches, in order to hold the pre-calculated state.

It would thus be desirable to provide an out of order issue queue that supported back to back issue of dependent instructions, and at the same time required only minimal amounts of additional hardware.

SUMMARY OF THE INVENTION

In embodiments of the invention, two or more instructions contained in an out of order issue queue are evaluated during a particular cycle of the queue, in order to select an instruction for issue during the next following cycle. If an instruction was previously designated to issue during the particular cycle, one or more instructions in the queue are evaluated to determine if any of them are dependent on the designated instruction. To carry out the evaluation, each instruction placed into the queue is accompanied by a set of logic elements. The logic elements for a given instruction provide the destination to source compare information, as described above, for the given instruction. In one embodiment of the invention, a method for selecting an instruction during a particular cycle, for issue during the next cycle, identifies the oldest ready instruction in the queue during the particular cycle. If an instruction was previously selected to issue during the particular cycle, it is determined whether at least a first instruction in the queue complies with each condition in a set of conditions. The set includes at least the conditions that the first instruction has a dependency on the previously selected instruction, and that the first instruction is older than the oldest ready instruction. The first instruction is selected for issue during the next following cycle only if the first instruction complies with each condition in the set.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
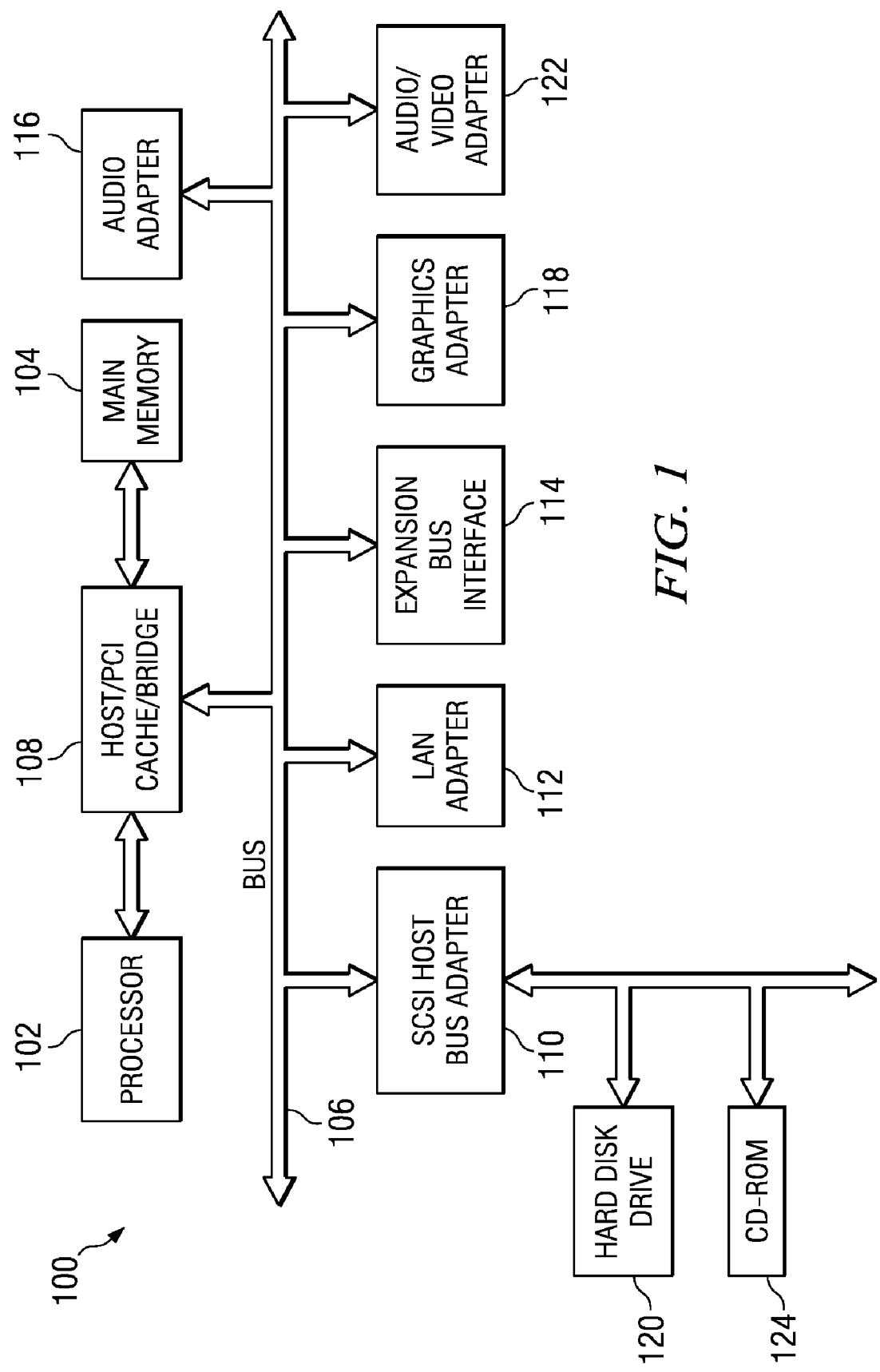
FIG. 1 is a block diagram showing a computer or data processing system that may be used in implementing an embodiment of the invention.

Referring to FIG. 1, there is shown a block diagram of a generalized data processing system 100 which may be used in implementing embodiments of the present invention. Data processing system 100 exemplifies a computer, in which code or instructions for implementing the processes of the present invention may be located. Data processing system 100 usefully employs a peripheral component interconnect (PCI) local bus architecture, although other bus architectures such as Accelerated Graphics Port (AGP) and Industry Standard Architecture (ISA) may alternatively be used. FIG. 1 shows a processor 102 and main memory 104 connected to a PCI local bus 106 through a Host/PCI bridge 108. PCI bridge 108 also may include an integrated memory controller and cache memory for processor 102.

Referring further to FIG. 1, there is shown a local area network (LAN) adapter 112, a small computer system interface (SCSI) host bus adapter 110, and an expansion bus interface 114 respectively connected to PCI local bus 106 by direct component connection. Audio adapter 116, a graphics adapter 118, and audio/video adapter 122 are connected to PCI local bus 106 by means of add-in boards inserted into expansion slots. SCSI host bus adapter 110 provides a connection for hard disk drive 120, and also for CD-ROM drive 124.

An operating system runs on processor 102 and is used to coordinate and provide control of various components within data processing system 100 shown in FIG. 1. The operating system may be a commercially available operating system such as Windows XP, which is available from Microsoft Corporation. Instructions for the operating system and for applications or programs are located on storage devices, such as hard disk drive 120, and may be loaded into main memory 104 for execution by processor 102.

In the invention, each instruction inserted or received into an out of order issue queue is accompanied by a corresponding set of logic elements. The logic elements for an instruction provide destination to source compare information for the instruction, and also provide other information to indicate whether the instruction is ready to issue. A set of logic elements is formed or generated just before its corresponding instruction is inserted into the queue, and is moved through the queue together with its corresponding instruction. The logic elements of a set are described further in connection with FIG. 3. By providing the logic element sets, it has been found that only a minimal amount of compares need to be done, in order to determine if there is a back to back dependency between an instruction and another previously selected instruction.

In embodiments of the invention, three or more instructions in a queue can be considered during a current cycle, for selection to issue during the very next cycle. More particularly, if an instruction was designated during the last cycle for issue during the current cycle, instructions sequentially positioned just behind the designated instruction are evaluated to determine if they have back to back dependencies on the designated instruction. The logic element sets corresponding to the evaluated instructions are used in this procedure. During the current cycle, one of the evaluated instructions that is found to be ready, or else the oldest ready cycle, is selected to issue during the very next cycle. The evaluation procedure is described in further detail, in connection with FIG. 2.

Figure 2:
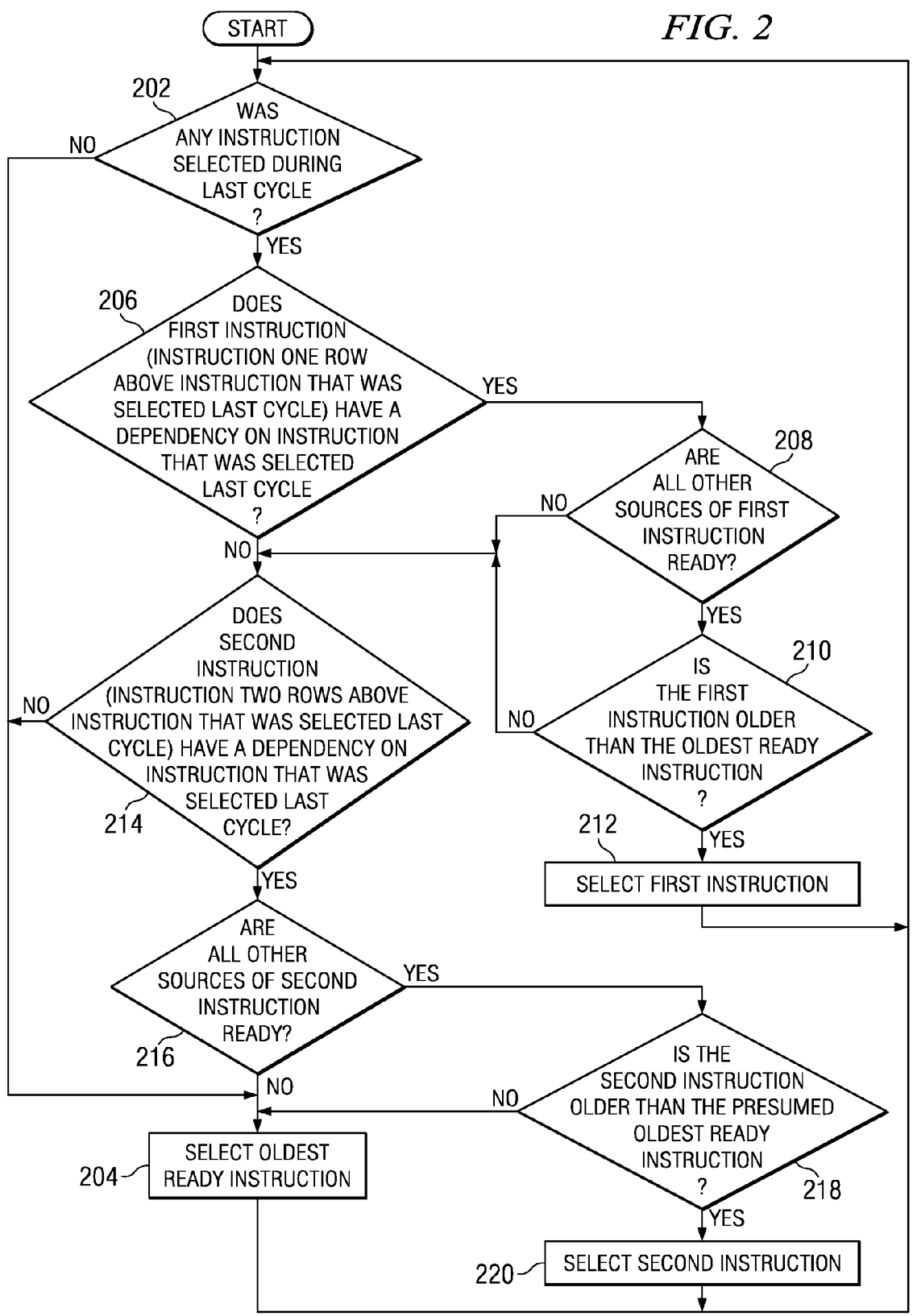
FIG. 2 is a flow chart showing respective steps of a method in accordance with an embodiment of the invention.

Referring to FIG. 2, there is shown a flow chart depicting successive steps of an embodiment of the invention, comprising a method to select an instruction for issue in an out of order issue queue. Upon starting the method of FIG. 2, it is first necessary to determine whether or not any instruction was selected or designated during the last cycle, in accordance with step 202, in order to issue during the current cycle. If no instruction was selected, the oldest instruction which is ready in the current cycle is selected for the issue queue, at step 204. On the other hand, if an instruction was selected during the last cycle, it is necessary to carry out step 206. That is, it must be determined whether a first instruction has a dependency on the instruction selected during the last cycle. As used herein, the first instruction is the instruction located one row or position above the instruction that was selected during the last cycle, for issue during the current cycle. Thus, the first instruction immediately follows the instruction selected last cycle in the issue queue. If the result of step 206 is positive, an important condition for establishing readiness of the first instruction has been fulfilled. Accordingly, it becomes necessary to proceed with step 208.

Step 208 requires determining whether the first instruction is dependent on any other source associated with instructions other than the instruction selected last cycle. If so, it is necessary to determine if all these sources are ready. If they are, the result of step 208 is positive, to indicate that the first instruction is ready for issue. Thereupon, step 210 must be carried out. At step 210, the first instruction is evaluated with respect to the oldest ready instruction, selected at step 204, to determine which of the two instructions is in fact the oldest. If the first instruction is found to be older, it is selected for issue during the next cycle of the queue, as shown by step 212, and the method of FIG. 2 is ended.

It will be appreciated that the first instruction cannot be selected for issue, if it is found to be unready at either step 206 or 208. It also cannot be selected, even if it is ready, if it is not found to be the oldest instruction at step 210. Accordingly, FIG. 2 further illustrates that if the result of any of the steps 206-210 is negative, the method of FIG. 2 proceeds to step 214. Step 214 is very similar to step 206 described above, except that it is concerned with a second instruction, comprising the instruction located two rows above the instruction selected during the last cycle. Step 214 is provided to determine whether the second instruction has a dependency on such instruction selected during the last cycle. If the result of step 214 is positive, it becomes necessary to proceed to step 216.

Step 216 requires determining whether the second instruction is dependent on any other sources associated with instructions other than the instruction selected last cycle. If so, it is necessary to determine if all these sources are ready. If they are, the result of step 216 is positive, to indicate that the second instruction is ready for issue. Thereupon, step 218 must be carried out. At step 218, the second instruction is evaluated with respect to the oldest ready instruction selected at step 204, to determine which of the two instructions is older. If the second instruction is found to be older, it is selected for issue during the next cycle of the queue, as shown by step 220, and the method of FIG. 2 is ended.

Similar to the first instruction, the second instruction cannot be selected if any of the steps 214-218 is negative. This would indicate that either the second instruction is not ready for issue, or that it is not as old as the oldest ready instruction. Accordingly, FIG. 2 shows that if any of the steps 214-218 produces a negative result, the oldest ready instruction of step 204 is selected for issue during the next following cycle.

Figure 3:
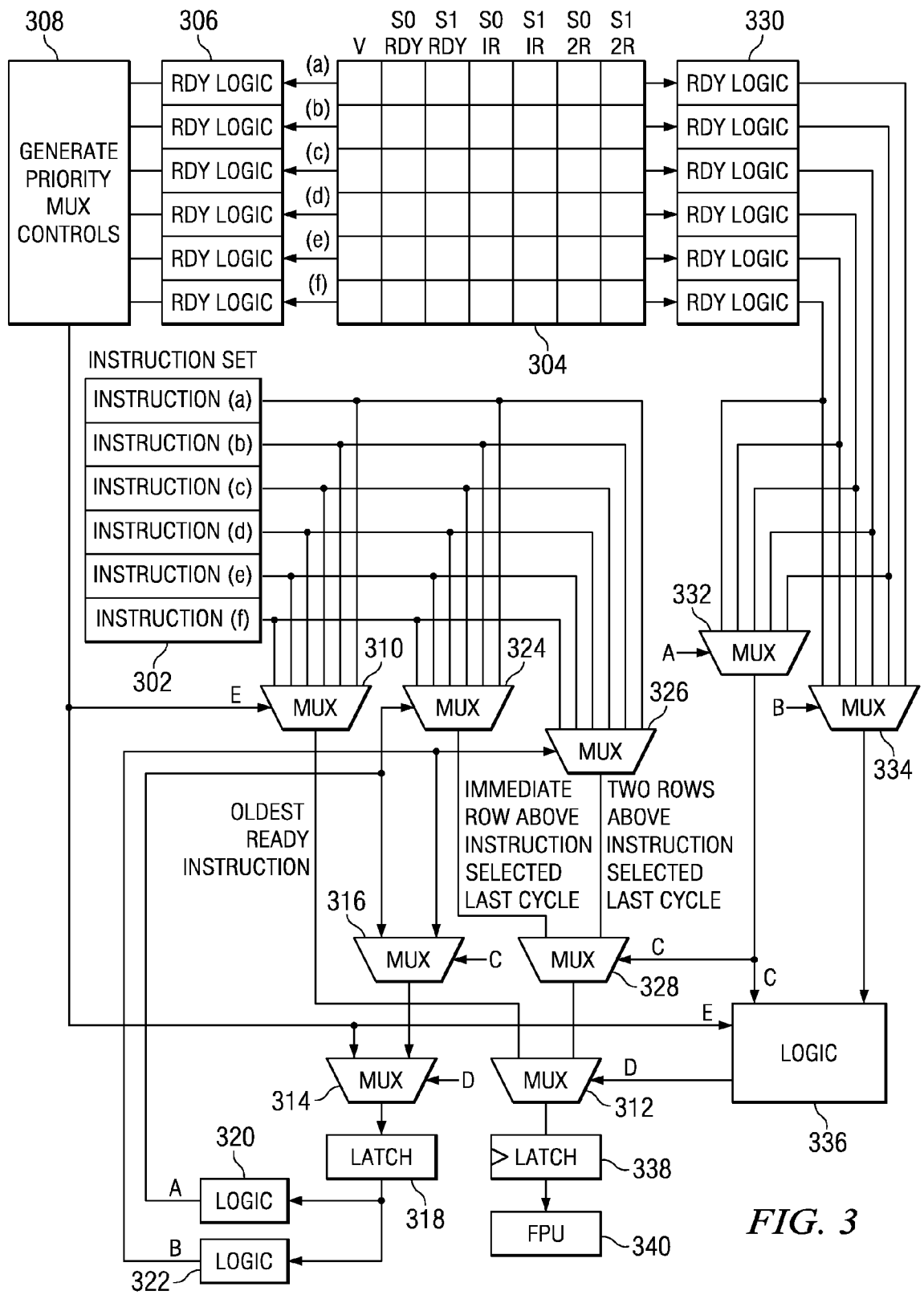
FIG. 3 is a schematic diagram showing a configuration of multiplexers and related components for use in implementing the embodiment of FIG. 2.

Referring to FIG. 3, there is shown a configuration of multiplexers and logic components that has been constructed to implement respective steps of the method of FIG. 2. FIG. 3 includes an instruction set 302, comprising instructions (a)-(f). These instructions are located at sequentially arranged positions in an out of order issue queue, for subsequent issue and execution. The instructions in set 302 become progressively older in proceeding from the top of set 302 to the bottom thereof, as viewed in FIG. 3. Thus, Instruction (d) is older, i.e., has been in the queue longer, than any Instruction (a)-(c).

As described above, an instruction must be ready before it can be issued out of the queue. Accordingly, FIG. 3 shows a block 304 containing control logic, wherein each row (a)-(f) in block 304 corresponds to one of the instructions (a)-(f), and comprises a set of logic elements therefor. The control logic indicates whether sources of respective instructions are ready, wherein the instructions are dependent on older instructions in the queue, that is, instructions in lower rows of instruction set 302. The fields in logic block 304 are as follows:

V=valid
S0 rdy=Source 0 is ready
S1 rdy=Source 1 is ready
S0 1r=Source 0 has a back to back dependency on the row below the current row
S1 1r=Source 1 has a back to back dependency on the row below the current row
S0 2r=Source 0 has a back to back dependency on the second row below the current row
S1 2r=Source 1 has a back to back dependency on the second row below the current row From the logic element sets contained in block 304, a logic component 306 is able to determine whether respective dependent instructions are ready. From this information, a multiplexer control generator 308 provides an information signal E, which is routed to multiplexer 310. Information signal E identifies the instruction found to be the oldest ready instruction during the current cycle of the queue. FIG. 3 shows multiplexer 310 also connected to respective instructions of set 302. Accordingly, in response to the information signal E, multiplexer 310 selects the oldest ready instruction, and couples such instruction as an input to multiplexer 312.

FIG. 3 further shows information signal E provided as an input to multiplexer 314, which receives the output of multiplexer 316 as an additional input. The output of multiplexer 314 is provided to a latch 318. As further described hereinafter, latch 318 contains information indicating the instruction of set 302 that was selected or designated during the last cycle, for issue during the current cycle. Latch 318 is connected to logic components 320 and 322, to identify the instruction selected last cycle to both components 320 and 322. Alternatively, latch 318 provides notice that no instruction was selected for issue during the last cycle.

In response to the information provided by latch 318, logic component 320 generates a multiplexer select signal A that selects, as a first instruction, the instruction in the row directly above the instruction selected last cycle. More particularly, logic component 320 sends multiplexer select signal A to a multiplexer 324 that is connected to respective instructions of set 302. Upon receiving the select signal A, multiplexer 324 provides the first instruction as an output, and couples such output to multiplexer 328 as an input thereto. For example, if instruction (d) was the instruction selected during the last cycle to issue during the current cycle, instruction (c) would be the first instruction, as shown by block 302.

In similar fashion, logic component 322 responds to the information provided by latch 318 by generating a multiplexer select signal B. Signal B selects, as a second instruction, the instruction that is two rows above the instruction selected last cycle. The multiplexer select signal B is directed to a multiplexer 326, also connected to respective instructions of set 302. Upon receiving select signal B, multiplexer 326 provides the second instruction as an output, and couples such output to multiplexer 328 as a second input thereto. Instruction (b) would be the second instruction, if the instruction selected last cycle was instruction (d).

Referring further to FIG. 3, there is shown a logic component 330 coupled to the logic block 304. Ready logic in component 330 determines whether or not respective instructions are ready, based on source compares, and this information is supplied to both multiplexers 332 and 334. Multiplexers 332 and 334 also receive multiplexer select signals A and B, respectively.

In response to select signal A, multiplexer 332 provides an output pertaining to the first instruction, described above. Multiplexer 332 is configured to provide an output signal C that is 1, if the logic element set for the first instruction shows that the first instruction is ready. Otherwise, the output signal C will be 0. Signal C is coupled as the select signal to multiplexer 328, in order to select either the output of multiplexer 324 or the output of multiplexer 326, according to whether output C is 1 or 0, respectively. Thus, the output of multiplexer 328 will pertain to the first instruction, if the first instruction is found to be ready. Otherwise, the output of multiplexer 328 will pertain to the second instruction. The output of multiplexer 328 serves as a second input to multiplexer 312, in addition to the input thereto representing the oldest ready instruction.

In response to select signal B, multiplexer 334 provides an output pertaining to the second instruction, to indicate whether the second instruction is or is not ready. The output of multiplexer 334 is applied as an input to a logic component 336. Component 336 also receives signals C and E as inputs, and produces a multiplexer select signal D as an output, which is applied to multiplexer 312.

Logic component 336 is constructed so that when output signal C indicates that the first instruction is ready, component 336 operates to determine whether the first instruction is older than the oldest ready instruction. The result of this determination is represented by multiplexer select signal D, which will cause multiplexer 312 to select the output of multiplexer 328, if the first instruction is found to be older. Otherwise, multiplexer 312 will select the output of multiplexer 310.

When output signal C indicates that the first instruction is not ready, logic component 336 operates to determine whether the second instruction is ready, and if it is, whether it is older than the oldest ready instruction. The result of this determination is again represented by select signal D. If the second instruction is ready, signal D will cause multiplexer 312 to select either the output of multiplexer 328 or 310, according to whether the second instruction or the oldest ready instruction, respectively, is found to be older.

The outputs sent to logic component 336 from multiplexers 332 and 334 may indicate that no instruction was selected last cycle, for issue during the current cycle, or that neither the first or second instruction was ready. When either event occurs, component 336 sends a multiplexer select signal D that causes multiplexer 328 to select the output of multiplexer 310, and to thus select the oldest ready instruction.

FIG. 3 shows a latch 338 disposed to receive the instruction provided by the output of multiplexer 312, and to retain the instruction until it is issued to FPU 340. FIG. 3 further shows multiplexers 314 and 318 operated by select signals C and D, respectively, to load the selected instruction into latch 318 for use during the next following cycle.

The above embodiment of the invention looks at two rows above the row that was selected last cycle, to determine a back to back dependency. However, other embodiments of the invention can include a greater number of rows to look at, in order to issue a back to back dependency instruction.

The invention can take the form of an entirely hardware embodiment, an entirely software embodiment or an embodiment containing both hardware and software elements. In a preferred embodiment, the invention is implemented in hardware, which includes but is not limited to integrated circuits, firmware, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a computer system having an out of order issue queue containing instructions, wherein the issue queue is operated during a succession of cycles to issue instructions during at least some of the cycles, a computer program product executable in a computer readable storage medium for selecting an instruction during a particular cycle for issue during the very next cycle following said particular cycle in said succession, said computer program product comprising:

program instructions for selecting said particular cycle to be a cycle during which a previously designated instruction is allowed to issue;

program instructions for identifying the oldest ready instruction in said queue during said particular cycle;

program instructions, operable when an instruction was designated during a previous cycle to issue during said particular cycle, for determining during said particular cycle whether at least a first instruction in said issue queue complies with each condition in a set of conditions, said first instruction complying with a first one of said conditions if it is determined during said particular cycle that said first instruction has a dependency on said designated instruction, and said first instruction complying with a second one of said conditions if it is determined during said particular cycle that said first instruction is older than said oldest ready instruction; and program instructions for selecting said first instruction for issue during said very next following cycle only if said first instruction complies with each condition in said set.

2. The computer program product of claim 1, wherein:
said first instruction is included in a plurality of instructions that are respectively associated with said designated instruction, and said method further comprises sequentially evaluating each instruction of said plurality during said particular cycle to determine whether any instruction of said plurality complies with each condition in said set.

3. The computer program product of claim 2, wherein:
when a given instruction of said plurality is found to comply with each condition in said set, said given instruction is selected for issue during said very next cycle, and said oldest ready instruction is selected for issue during said very next cycle, when no instruction of said plurality is found to comply with each condition of said set.

4. The computer program product of claim 2, wherein:
each instruction of said plurality has a corresponding set of logic elements, wherein the logic element set corresponding to a given instruction of said plurality is used in determining whether said given instruction has a dependency on said designated instruction.

5. The computer program product of claim 4, wherein:
the logic element set, that corresponds to said given instruction, is generated just before said given instruction is entered into said issue queue.

6. In a computer system having an out of order issue queue containing instructions, wherein the issue queue is operated during successive cycles to issue instructions during at least some of the cycles, apparatus for selecting an instruction during a particular cycle for issue during the very next cycle following said particular cycle in said succession, said apparatus comprising:

a component for selecting said particular cycle to be a cycle during which a previously designated instruction is allowed to issue;

a first logic component for identifying the oldest ready instruction in said queue during said particular cycle;

a configuration of multiplexers and logic gates for determining whether an instruction was designated during a previous cycle to issue during said particular cycle, and to further determine during said particular cycle whether at least a first instruction in said issue queue complies with each condition in a set of conditions, said first instruction complying with a first one of said conditions if it is determined during said particular cycle that said first instruction has a dependency on said designated instruction, and said first instruction complying with a second one of said conditions if it is determined during said particular cycle that said first instruction is older than said oldest ready instruction; and a second logic component for selecting said first instruction to issue during said very next cycle only if said first instruction complies with each condition in said set.

7. The apparatus of claim 6, wherein:

said first instruction is included in a plurality of instructions respectively associated with said designated instruction, and said second logic component is adapted to sequentially evaluate each instruction of said plurality during said particular cycle to determine whether any instruction of said plurality complies with each condition in said set.

8. The apparatus of claim 7, wherein:

when a given instruction of said plurality is found to comply with each condition in said set, said second logic component selects said given instruction for issue during said very next cycle, and said second logic component selects said oldest ready instruction for issue during said very next cycle, if no instruction of said plurality is found to comply with each condition of said set.

9. The apparatus of claim 6, wherein:

said configuration is connected to a set of logic elements corresponding to each instruction of said plurality, wherein the logic element set corresponding to a given instruction of said plurality is used with said configuration in determining whether said given instruction has a dependency on said designated instruction.

10. The apparatus of claim 9, wherein:

the logic element set, that corresponds to said given instruction, is generated just before said given instruction is entered into said issue queue.

\* \* \* \* \*